United States Patent
Li et al.

(10) Patent No.: US 10,948,427 B2
(45) Date of Patent: Mar. 16, 2021

(54) SCANNED IMAGE CORRECTION APPARATUS, METHOD AND MOBILE SCANNING DEVICE

(71) Applicants: Tsinghua University, Beijing (CN); Nuctech Company Limited, Beijing (CN)

(72) Inventors: Ke Li, Beijing (CN); Jianmin Li, Beijing (CN); Weifeng Yu, Beijing (CN); Yulan Li, Beijing (CN); Xuejing Yang, Beijing (CN); Yuanjing Li, Beijing (CN); Chunguang Zong, Beijing (CN); Zhiqiang Chen, Beijing (CN); Li Zhang, Beijing (CN)

(73) Assignees: Nuctech Company Limited, Beijing (CN); Tsinghua University, Beijing (CN)

(*) Notice: Subject to any disclaimer, the term of this patent is extended or adjusted under 35 U.S.C. 154(b) by 38 days.

(21) Appl. No.: 16/231,373

(22) Filed: Dec. 21, 2018

(65) Prior Publication Data

US 2019/0204240 A1 Jul. 4, 2019

(30) Foreign Application Priority Data

Dec. 28, 2017 (CN) .......................... 201711456583.9

(51) Int. Cl.
*G01N 23/04* (2018.01)

(52) U.S. Cl.
CPC .......... *G01N 23/04* (2013.01); *G01N 2223/04* (2013.01); *G01N 2223/303* (2013.01); *G01N 2223/33* (2013.01); *G01N 2223/401* (2013.01)

(58) Field of Classification Search
None
See application file for complete search history.

(56) References Cited

U.S. PATENT DOCUMENTS

| 5,361,217 A * | 11/1994 | Makimura ............. G01C 15/00 356/3 |
| 2008/0170660 A1* | 7/2008 | Gudmundson ...... G06K 9/6255 378/57 |

(Continued)

FOREIGN PATENT DOCUMENTS

| CN | 1883390 A | 12/2006 |
| CN | 101900823 A | 12/2010 |

(Continued)

OTHER PUBLICATIONS

"European Application No. 18211129.4, Extended European Search Report dated May 3, 2019", (May 3, 2019), 8 pgs.

(Continued)

*Primary Examiner* — Edwin C Gunberg
(74) *Attorney, Agent, or Firm* — Schwegman Lundberg & Woessner, P. A.

(57) ABSTRACT

The present disclosure provides a scanned image correction apparatus, method and a mobile scanning device. The apparatus includes an image collector, an arm swing detector, and an image processor. The image collector is configured to collect a scanned image of an object under inspection during a scanning process of scanning the object under inspection by the mobile scanning device, and determine an image parameter of the scanned image. The arm swing detector is disposed at a monitor point on a detector arm of the mobile scanning device, and configured to detect a displacement offset of the detector arm in a specified direction and build an arm swing model of the detector arm. The image processor is configured to determine a change relationship between the image parameter of the scanned image and the displacement offset of the detector arm, and correct the scanned image based on the change relationship.

13 Claims, 3 Drawing Sheets

(56) References Cited

U.S. PATENT DOCUMENTS

2013/0011018 A1* 1/2013 Tateno ................ G01B 11/002
382/106
2015/0314452 A1 11/2015 Tateno

FOREIGN PATENT DOCUMENTS

| CN | 102135709 A | 7/2011 |
|---|---|---|
| CN | 102885634 A | 1/2013 |
| CN | 103025229 A | 4/2013 |
| CN | 108254395 A | 7/2018 |
| EP | 2543483 A1 | 1/2013 |
| JP | 2001276039 A | 10/2001 |

OTHER PUBLICATIONS

"International Application No. PCT/CN2018/118468, International Search Report and Written Opinion dated Mar. 8, 2019", (Mar. 8, 2019), 11 pgs.

\* cited by examiner

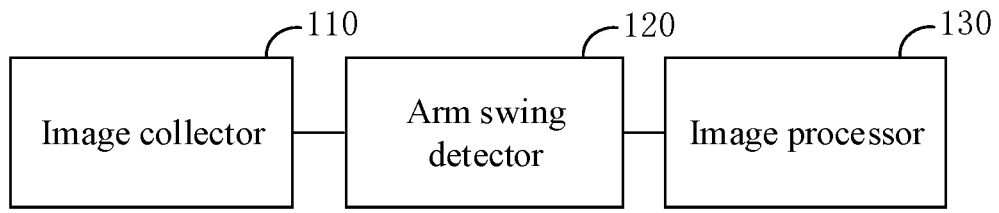
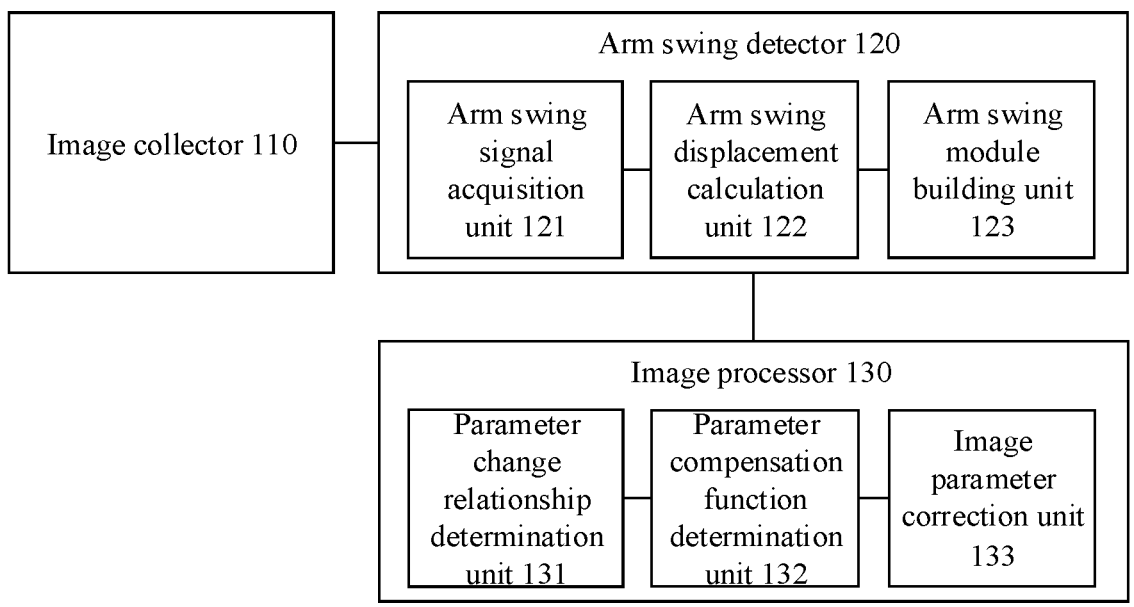
Fig. 2

SCANNED IMAGE CORRECTION APPARATUS, METHOD AND MOBILE SCANNING DEVICE

CROSS-REFERENCE TO RELATED APPLICATION

This application is based upon and claims priority to Chinese Patent Application No. 201711456583.9, filed on Dec. 28, 2017, the content of which is incorporated herein by reference in its entirety.

FIELD

The present disclosure relates to the field of imaging technology, and more particularly to a scanned image correction apparatus, method and a mobile scanning device.

BACKGROUND

A mobile scanning device adopts a cantilever structure, and a detector boom may inevitably sway during a scanning process. Especially at present, there are more and more scanning devices with a large scanning channel. As the scanning channel becomes larger, the swing of the detector boom is intensified. The swing of the detector boom will cause fluctuation of an amount of radiation received by a detector located at the detector boom, resulting in bright and dark stripes on a scanned image. The stripes caused by the swing of the detector boom will degrade image scanning indexes such as spatial line resolution, contrast line resolution and spatial line pairs, and thus affect the imaging quality.

Conventionally, the swing of the detector boom may usually be restricted by installing a locking device, but in this way, the improvement on the imaging quality has a low accuracy and the improvement effect is poor.

SUMMARY

The embodiments of the present disclosure provide a scanned image correction apparatus, method and a mobile scanning device.

According to an aspect of embodiments of the present disclosure, an apparatus including an image collector, an arm swing detector, and an image processor is provided.

The image collector is configured to collect a scanned image of an object under inspection during a scanning process of scanning the object under inspection by the mobile scanning device, and determine an image parameter of the scanned image.

The arm swing detector is disposed at a monitor point on a detector arm of the mobile scanning device, and configured to detect a displacement offset of the detector arm in a specified direction and build an arm swing model of the detector arm, wherein the arm swing model is used to fit a functional relationship between the displacement offset of the detector arm and time in the scanning process.

The image processor is configured to determine a change relationship between the image parameter of the scanned image and the displacement offset of the detector arm based on the arm swing model and the image parameter of the scanned image, and correct the scanned image based on the change relationship.

According to another aspect of embodiments of the present disclosure, a method is provided. The method includes collecting a scanned image of an object under inspection and determining an image parameter of the scanned image during a scanning process of scanning the object under inspection by a mobile scanning device, via an image collector; detecting a displacement offset of a detector arm of the mobile scanning device in a specified direction and building an arm swing model of the detector arm during the scanning process, via an arm swing detector disposed at a monitor point on the detector arm, wherein the arm swing model is used to fit a functional relationship between the displacement offset of the detector arm and time in the scanning process; and determining a change relationship between the image parameter of the scanned image and the displacement offset of the detector arm based on the arm swing model and the image parameter of the scanned image and correcting the scanned image based on the change relationship, via an image processor.

According to a further aspect of embodiments of the present disclosure, a mobile scanning device is provided. The mobile scanning device includes a ray source, a collimator, a detector arm, a detector, and the apparatus of the above embodiments. The detector arm includes a first sub-detector arm and a second sub-detector arm, the first sub-detector arm is configured to be horizontal or vertical to the second sub-detector arm, and the detector is disposed on at least one of the first sub-detector arm and the second sub-detector arm. The ray source is configured to radiate rays to penetrate an object under inspection. The rays radiated by the ray source are directed to the detector via the collimator. The detector is configured to receive the rays that penetrate the object under inspection, and generate a scanned image of the object under inspection from the received rays.

BRIEF DESCRIPTION OF THE DRAWINGS

To more clearly illustrate technical solutions of embodiments of the present disclosure, the accompanying drawings, which are to be referred by the embodiments of the present disclosure, will be briefly described. Those skilled in the art will be able to obtain additional drawings in accordance with these drawings without any creative work.

FIG. 1 is a schematic structure diagram showing a scanned image correction apparatus according to embodiments of the present disclosure;

FIG. 2 is a detailed schematic structure diagram showing a scanned image correction apparatus according to some embodiments of the present disclosure;

DETAILED DESCRIPTION

Figure 3:
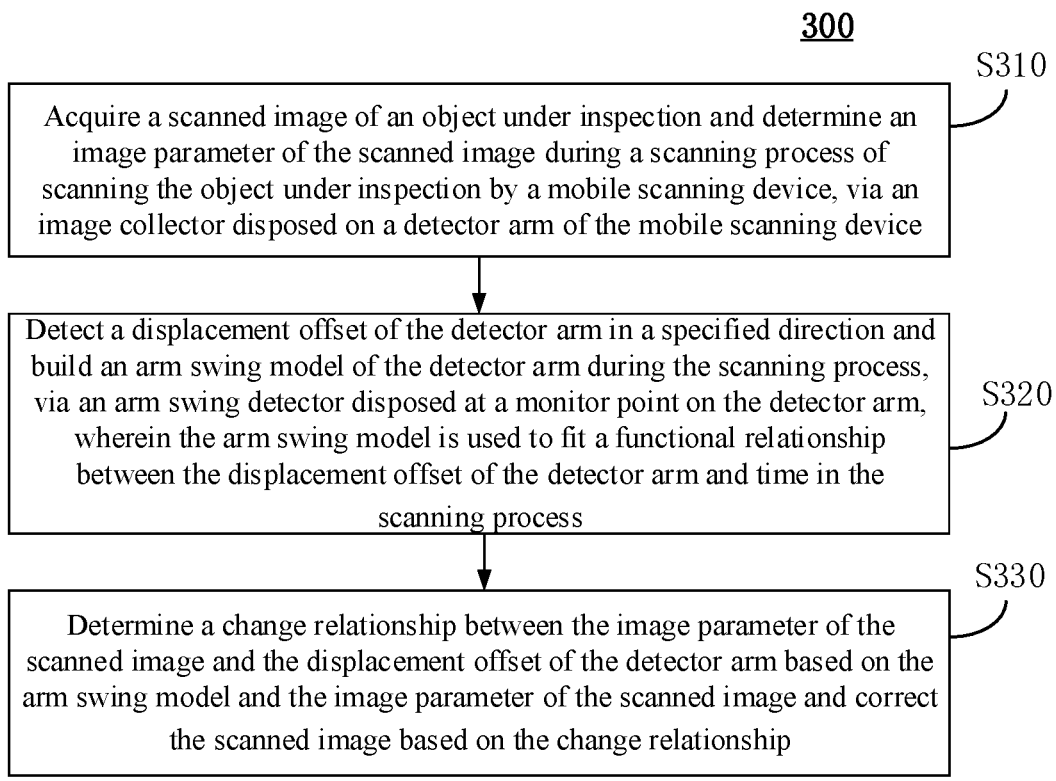
FIG. 3 is a flow chart showing a scanned image correction method according to embodiments of the present disclosure.

Various aspects of features and exemplary embodiments of the present disclosure will be described in detail below. The present disclosure will be provided in further detail below in conjunction with accompanying drawings and embodiments in order to make objects, technical solutions and advantages of the present disclosure to be more clearly understood. It is to be appreciated that the specific embodiments described herein are to be construed to illustrate the present disclosure but not to limit the present disclosure. It will be apparent to those skilled in the art that the present disclosure may be practiced without some of these specific details. The following description of the embodiments is merely to provide a better understanding of the present disclosure by illustrating examples thereof.

It is to be noted that relational terms such as first, second and the like are used herein only to distinguish an entity or operation from another entity or operation without requiring or implying that there is any such actual relationship or order between these entities or operations. Moreover, the term "comprise", "include" or any other variant thereof is intended to encompass a non-exclusive inclusion, such that a process, method, article or device that includes a series of elements includes not only these elements but also other elements that are not explicitly listed or those elements that are inherent to such a process, method, article or device. In the absence of more restrictions, elements defined by the statement "includes . . . " do not preclude the presence of additional identical elements in the process, method, article or device that includes the elements.

In order to better understand the present disclosure, a scanned image correction apparatus, a scanned image correction method, and a mobile scanning device according to embodiments of the present disclosure will be described in detail below with reference to the accompanying drawings. It should be noted that these embodiments are not intended to limit the scope of the present disclosure.

FIG. 1 is a schematic structure diagram showing a scanned image correction apparatus according to embodiments of the present disclosure. As shown in FIG. 1, the scanned image correction apparatus 100 of the embodiments of the present disclosure includes an image collector 110, an arm swing detector 120, and an image processor 130.

The image collector 110 is disposed on a detector arm of the mobile scanning device, and configured to acquire a scanned image of an object under inspection and determine an image parameter of the scanned image during a scanning process of scanning the object under inspection by the mobile scanning device.

The arm swing detector 120 is disposed at a monitor point on the detector arm, and configured to detect a displacement offset of the detector arm in a specified direction and build an arm swing model of the detector arm during the scanning process. The arm swing model may be used to fit a functional relationship between the displacement offset of the detector arm and time in the scanning process.

The image processor 130 is configured to determine a change relationship between the image parameter of the scanned image and the displacement offset of the detector arm based on the arm swing model and the image parameter of the scanned image, and correct the scanned image based on the change relationship.

In the embodiments of the present disclosure, the arm swing detector may be disposed on the detector arm of the scanning device to acquire swing data of the detector arm during the scanning process, build a swing model of the detector arm according to the swing data of the detector arm during the scanning process, determine the swing model and the image parameter of the scanned image, determine a change relationship between the swing displacement of the detector arm and the image parameter of the scanned image, calculate a compensation amount for the image parameter of the scanned image and correct the scanned image according to the compensation amount for the image parameter, thereby achieving the purpose of improving the scanned image.

FIG. 2 is a detailed schematic structure diagram showing a scanned image correction apparatus according to some exemplary embodiments of the present disclosure. The same or equivalent structures in FIG. 2 and FIG. 1 are denoted by the same reference numerals.

As shown in FIG. 2, in some embodiments, the arm swing detector 120 may specifically include an arm swing signal acquisition unit 121, an arm swing displacement calculation unit 122, and an arm swing model building unit 123.

Specifically, the arm swing signal acquisition unit 121 is configured to acquire an acceleration value of the detector arm in a specified direction during the scanning process.

The arm swing displacement calculation unit 122 is configured to calculate a displacement offset of the detector arm at each specified moment and in the specified direction according to the acquired acceleration value.

The arm swing model building unit 123 is configured to determine a correspondence relationship curve between the displacement offset of the detector arm and the time in the scanning process according to the calculated displacement offset, and fit the correspondence relationship curve to obtain the arm swing model of the detector arm.

In an embodiment, the arm swing signal acquisition unit 121 may include a plurality of acceleration sensors that are disposed at a plurality of monitor points of the detector arm.

In the embodiment, the arm swing signal acquisition unit 121 may also be configured to acquire an acceleration value of each monitor point of the detector arm at a specified moment and in the specified direction by using the plurality of acceleration sensors during the scanning process.

In an embodiment, the specified direction may be a traveling direction of the mobile scanning device, and the arm swing signal acquisition unit may acquire the acceleration values of individual monitor points on the detector arm at each moment during the scanning process along the traveling direction of the mobile scanning device.

In the embodiment, the arm swing displacement calculation unit 122 may be further configured to calculate the displacement offset of each monitor point of the detector arm at each specified moment according to the acceleration values acquired by the plurality of acceleration sensors.

In an embodiment, the acceleration value can be used to measure a change rate of an arm swing speed of the detector arm at the monitor point. In order to obtain the displacement offset of each monitor point of the detector arm at each specified moment, the acceleration value can be utilized to calculate the corresponding displacement offset. For example, the displacement offset of each monitor point of the detector arm at each specified moment may be calculated by performing a double integration on the acquired acceleration values. It should be understood that other methods may also be used to calculate the corresponding displacement offset according to the acquired acceleration values, and the present disclosure does not specifically limit processes or algorithms of the calculation.

In the embodiment, the arm swing model building unit 123 may be further configured to determine the correspondence relationship curve between the displacement offset of the detector arm at each monitor point and the time in the scanning process according to the calculated displacement offset. The arm swing model of the detector arm can be obtained by fitting the correspondence relationship curve.

In the embodiment, in order to more accurately monitor the displacement of the detector arm, the displacement of each monitor point on the detector arm at each moment in the scanning process is calculated according to the acceleration values acquired by the acceleration sensors, so as to fit the relationship curve between the displacement of each monitor point on the detector arm and the time and build the arm swing model of the detector arm.

In embodiments of the present disclosure, the detector arm of the mobile scanning device may include at least one of two sub-detector arms, which may be arranged horizontally or vertically. The sub-detector arm includes at least one monitor area. The acceleration sensors are arranged at monitor points in the at least one monitor area.

In the description of the following embodiments, the two sub-detector arms of the detector arm may be referred to as a first sub-detector arm and a second sub-detector arm. As an example, the first sub-detector arm may be a horizontal detector arm of the mobile scanning device, and the second sub-detector are may be a vertical detector arm of the mobile scanning device.

In an embodiment, the acceleration sensor may be disposed only on at least one monitor point in at least one monitor area of the first sub-detector arm. That is, the detector arm may include the first sub-detector arm including at least one first monitor area; the plurality of acceleration sensors may be arranged to be located at monitor points in the at least one first monitor area. In the embodiment, the arm swing model includes a first arm swing sub-model for fitting a functional relationship between the displacement offset of the first sub-detector arm and the time in the scanning process.

In the embodiment, with the first arm swing sub-model and the image parameter of the scanned image acquired by the first sub-detector arm, it may be possible to determine a change relationship between the image parameter of the scanned image and the displacement offset of the first sub-detector arm, and correct the scanned image acquired by the first sub-detector arm based on the change relationship.

In an embodiment, the acceleration sensor may be disposed only on at least one monitor point in at least one monitor area of the second sub-detector arm. That is, the detector arm may include the second sub-detector arm including at least one second monitor area; the plurality of acceleration sensors may be arranged to be located at monitor points in the at least one second monitor area. In the embodiment, the arm swing model includes a second arm swing sub-model for fitting a functional relationship between the displacement offset of the second sub-detector arm and the time in the scanning process.

In the embodiment, with the second arm swing sub-model and the image parameter of the scanned image acquired by the second sub-detector arm, it may be possible to determine a change relationship between the image parameter of the scanned image and the displacement offset of the second sub-detector arm, and correct the scanned image acquired by the second sub-detector arm based on the change relationship.

In order to more accurately detect the arm swing of the detector arm during the scanning process, the plurality of acceleration sensors included in the arm swing signal acquisition unit 121 may be simultaneously disposed on a plurality of detector arms.

In an embodiment, the detector arm may include a first sub-detector arm and a second sub-detector arm. The first sub-detector arm includes at least one first monitor area, and the second sub-detector arm includes at least one second monitor area. Some of the plurality of acceleration sensors may be disposed at monitor points in the at least one first monitor area, and some other of the plurality of acceleration sensors may be disposed at monitor points in the at least one second monitor area.

In the embodiment, the arm swing model may include a first arm swing sub-model and a second arm swing sub-model. The first arm swing sub-model may be used to fit a functional relationship between the displacement offset of the first sub-detector arm and the time in the scanning process. The second arm swing sub-model may be used to fit a functional relationship between the displacement offset of the second sub-detector arm and the time in the scanning process.

As an example, a plurality of arm swing signal acquisition units may be evenly arranged on the horizontal detector arm and/or the vertical detector arm of the mobile scanning device, respectively. When the mobile scanning device starts scanning the object under inspection, along the traveling direction of the mobile scanning device, the arm swing signal acquisition unit records the acceleration value of each monitor point at each specified moment by the acceleration sensor; the arm swing displacement calculation unit calculates the displacement offset of each monitor point of the detector arm at each specified moment according to the acquired acceleration value, determines the correspondence relationship curve between the displacement of the detector arm at each monitor point and the time in the scanning process, and fits the correspondence relationship curve to obtain the arm swing model of the detector arm.

With continued reference to FIG. 2, in some embodiments, the image processor 130 may specifically include a parameter change relationship determination unit 131, a parameter compensation function determination unit 132, and an image parameter correction unit 133.

The parameter change relationship determination unit 131 is configured to determine the change relationship between the image parameter of the scanned image and the displacement offset of the detector arm by using the image parameter of the scanned image and the arm swing model built by the arm swing detector.

The parameter compensation function determination unit 132 is configured to analyze the change relationship between the image parameter and the displacement offset of the detector arm, and linearly fit a functional relationship between the displacement offset of the detector arm and a parameter compensation amount according to the change relationship.

The image parameter correction unit 133 is configured to calculate the parameter compensation amount of the scanned image according to the acquired displacement offset of each monitor point of the detector arm at each specified moment and the linearly fitted functional relationship between the displacement offset of the detector arm and the parameter compensation amount, and correct the image parameter of the scanned image by using the parameter compensation amount.

In an embodiment, the linearly fitted functional relationship between the displacement offset of the detector arm and the parameter compensation amount can be expressed as a linear function expression. An independent variable of the linear function expression is the acquired displacement offset of each monitor point of the detector arm at each specified moment, and a dependent variable of the linear function expression is the parameter compensation amount. A fitting parameter of the linear function expression depends on the structure of the detector boom. The fitting parameter of the linear function expression may be different for different structures of the detector boom.

In the embodiment, according to the change relationship between the arm swing displacement and the image parameter of the scanned image, it is possible to calculate a compensation value of the image parameter, and correct the image parameter of the scanned image according to the compensation value of the image parameter.

In an embodiment, the image parameter may include a resolution or a grayscale value of the scanned image.

In the embodiments of the present disclosure, the arm swing detector can be used to record the swing of the detector boom during the scanning process of the mobile scanning device so as to build the arm swing model; establish a correspondence relationship between the arm swing and the image and correct the currently scanned image according to the displacement data of individual monitor points acquired during each scanning. Compared with changing a mechanical structure of the mobile scanning device, the scanned image correction apparatus of the embodiments of the present disclosure can improve the image quality of the scanned image from the mobile scanning device, enhance the imaging performance indexes of the mobile scanning device and thus cause an improvement effect of providing a high-precision imaging, without changing the mechanical structure of the mobile scanning device and increasing the installation and maintenance cost of the device.

A scanned image correction method according to embodiments of the present disclosure will be described below with reference to the accompanying drawings. FIG. 3 is a flow chart showing a scanned image correction method according to embodiments of the present disclosure. As shown in FIG. 3, the scanned image correction method 300 in the embodiments of the present disclosure includes the following steps.

At step S310, an image collector disposed on a detector arm of a mobile scanning device acquires a scanned image of an object under inspection and determines image parameter of the scanned image during a scanning process of scanning the object under inspection by the mobile scanning device.

At step S320, during the scanning process, an arm swing detector disposed at a monitor point on the detector arm detects a displacement offset of the detector arm in a specified direction and builds an arm swing model of the detector arm. The arm swing model is used to fit a functional relationship between the displacement offset of the detector arm and time in the scanning process.

In an embodiment, the step S320 may specifically include acquiring an acceleration value of the detector arm in the specified direction; calculating the displacement offset of each monitor point of the detector arm at each specified moment and in the specified direction according to the acquired acceleration value; determining the correspondence relationship curve between the displacement offset of the detector arm and the time in the scanning process according to the calculated displacement offset, and fitting the correspondence relationship curve to obtain the arm swing model of the detector arm.

As a specific embodiment, the step S320 may further include at step S321, acquiring, during the scanning process, an acceleration value of each monitor point of the detector arm at a specified moment and in a specified direction, via a plurality of acceleration sensors disposed on the detector arm; at step S322, calculating the displacement offset of each monitor point of the detector arm at each specified moment according to the acceleration values acquired by the plurality of acceleration sensors; and at step S323, determining the correspondence relationship curve between the displacement offset of the detector arm at each monitor point and the time in the scanning process according to the calculated displacement offset, and fitting the correspondence relationship curve to obtain the arm swing model of the detector arm.

With the above steps S321 to S323, the displacement of each monitor point on the detector arm at each moment in the scanning process may be calculated according to the acceleration values acquired by the acceleration sensors, so as to fit the functional relationship curve between the displacement of each monitor point on the detector arm and the time and build the arm swing model of the detector arm.

In an embodiment, the detector arm of the mobile scanning device may include at least one of two sub-detector arms, which may be arranged horizontally or vertically. The sub-detector arm includes at least one monitor area. The plurality of acceleration sensors are arranged at monitor points in the at least one monitor area.

In an embodiment, the detector arm may include a first sub-detector arm including at least one first monitor area. The plurality of acceleration sensors may be arranged to be located at monitor points in the at least one first monitor area. In the embodiment, the arm swing model includes a first arm swing sub-model for fitting a functional relationship between the displacement offset of the first sub-detector arm and the time in the scanning process.

In an embodiment, the detector arm may include a second sub-detector arm including at least one second monitor area. The plurality of acceleration sensors may be arranged to be located at monitor points in the at least one second monitor area. In the embodiment, the arm swing model includes a second arm swing sub-model for fitting a functional relationship between the displacement offset of the second sub-detector arm and the time in the scanning process.

In the embodiment, with the second arm swing sub-model and the image parameter of the scanned image acquired by the second sub-detector arm, it may be possible to determine a change relationship between the image parameter of the scanned image and the displacement offset of the second sub-detector arm, and correct the scanned image acquired by the second sub-detector arm based on the change relationship.

In an embodiment, the detector arm may include a first sub-detector arm and a second sub-detector arm. The first sub-detector arm includes at least one first monitor area, and the second sub-detector arm includes at least one second monitor area. In the embodiment, some of the plurality of acceleration sensors may be disposed at monitor points in the at least one first monitor area, and some other of the plurality of acceleration sensors may be disposed at monitor points in the at least one second monitor area. In the embodiment, the arm swing model may include a first arm swing sub-model and a second arm swing sub-model. The first arm swing sub-model may be used to fit a functional relationship between the displacement offset of the first sub-detector arm and the time in the scanning process. The second arm swing sub-model may be used to fit a functional relationship between the displacement offset of the second sub-detector arm and the time in the scanning process.

In an embodiment of the present invention, the mobile scanning device may include a plurality of detector arms, and the arm swing detector may be disposed on at least one of the detector arms. During the scanning process, the arm swing detector may calculate the arm swing displacement of the detector arm based on the acceleration data of the arm swing acquired by the acceleration sensor, so as to build the corresponding arm swing model of the detector arm and thus provide a precise data basis for a subsequent evaluation of the influence of the arm swing displacement of the detector arm on the imaging of the object under inspection during the scanning process.

In the embodiment, the step S320 may specifically include at step S10, during the scanning process, acquiring the acceleration value of the first sub-detector arm at each monitor point of the first monitor area at a specified moment and in the specified direction by using the acceleration sensor at the monitor point in at least one first monitor area; and at step S11, calculating the displacement offset of the first sub-detector arm at each monitor point in the first monitor area at the specified moment according to the acquired acceleration value of the first sub-detector arm at each monitor point in the first monitor area at the specified moment, and building the first arm swing sub-model.

In the embodiment, the step S320 may specifically include at step S20, during the scanning process, acquiring the acceleration value of the second sub-detector arm at each monitor point of the second monitor area at a specified moment and in the specified direction by using the acceleration sensor at the monitor point in at least one second monitor area; and at step S21, calculating the displacement offset of the second sub-detector arm at each monitor point in the second monitor area at the specified moment according to the acquired acceleration value of the second sub-detector arm at each monitor point in the second monitor area at the specified moment, and building the second arm swing sub-model.

In the embodiment, the first arm swing sub-model and the second arm swing sub-model can be fitted to obtain the arm swing model of the detector arm of the mobile scanning device.

At step 330, a change relationship between the image parameter of the scanned image and the displacement offset of the detector arm may be determined based on the arm swing model and the image parameter of the scanned image and the scanned image may be corrected based on the change relationship.

In an embodiment, the step S330 may specifically include at step S331, determining the change relationship between the image parameter of the scanned image and the displacement offset of the detector arm by using the image parameter of the scanned image and the arm swing model built by the arm swing detector; at step S332, analyzing the change relationship between the image parameter and the displacement offset of the detector arm, and linearly fitting a functional relationship between the displacement offset of the detector arm and a parameter compensation amount according to the change relationship; and at step S333, calculating the parameter compensation amount of the scanned image according to the acquired displacement offset of each monitor point of the detector arm at each specified moment and the linearly fitted functional relationship between the displacement offset of the detector arm and the parameter compensation amount, and correcting the image parameter of the scanned image by using the parameter compensation amount.

In the embodiment, by analyzing the change relationship between the arm swing displacement and the image parameter of the scanned image, the compensation value of the image parameter is calculated, and the image parameter of the scanned image is corrected according to the compensation value of the image parameter.

The scanned image correction apparatus of the embodiments of the present disclosure can improve the image quality of the scanned image from the mobile scanning device, enhance the imaging performance indexes of the mobile scanning device, provide high-precision calculations and thus cause a better effect of improving the image quality, without changing the mechanical structure of the mobile scanning device.

Other details of the scanned image correction method according to the embodiments of the present disclosure are similar to those of the scanned image correction apparatus according to the embodiments of the present disclosure described above with reference to FIG. 1 and FIG. 2, and will not be described herein again.

Figure 4:
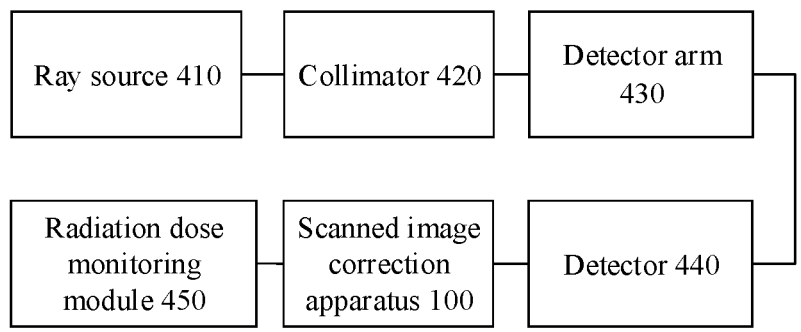
FIG. 4 is a schematic structure diagram showing a mobile scanning device according to embodiments of the present disclosure.

FIG. 4 is a schematic structure diagram showing a mobile scanning device according to embodiments of the present disclosure. As shown in FIG. 4, in an embodiment, the mobile scanning device 400 may include a ray source 410, a collimator 420, a detector arm 430, a detector 440, and the scanned image correction apparatus 100 described in the above embodiments of the present invention.

The detector arm 430 includes a first sub-detector arm and a second sub-detector arm. The first sub-detector arm is configured to be horizontal or vertical to the second sub-detector arm, and the detector 440 may be disposed on at least one of the first sub-detector arm and the second sub-detector arm.

The ray source 410 is configured to radiate rays to penetrate an object under inspection. The rays radiated by the ray source 410 are directed to the detector 440 via the collimator 420.

The detector 440 is configured to receive the rays that penetrate the object under inspection, and generate a scanned image of the object under inspection from the received rays.

In an embodiment, the ray source 410 is an accelerator that can generate rays.

In an embodiment, the mobile scanning device may further include a radiation dose monitoring module 450 configured to monitor a radiation dose of the rays so as to calibrate the radiation dose of the ray source.

In the embodiment, when the radiation dose of the rays generated by the ray source fluctuates, the image quality may be affected. In order to increase the accuracy of the compensation to the image parameter by the scanned image correction device according to the arm swing and avoid the influence caused by the radiation dose fluctuation of the ray source, the radiation dose monitoring module can be added ahead of the collimator to acquire data about the radiation dose fluctuation and correct the scanned image by removing the interference from the radiation dose fluctuation.

A scanned image correction apparatus and an image scanning method according to embodiments of the present disclosure will be described below with reference to FIG. 5, which is a schematic structure diagram showing a mobile scanning device according to an exemplary embodiment of the present disclosure.

Figure 5:
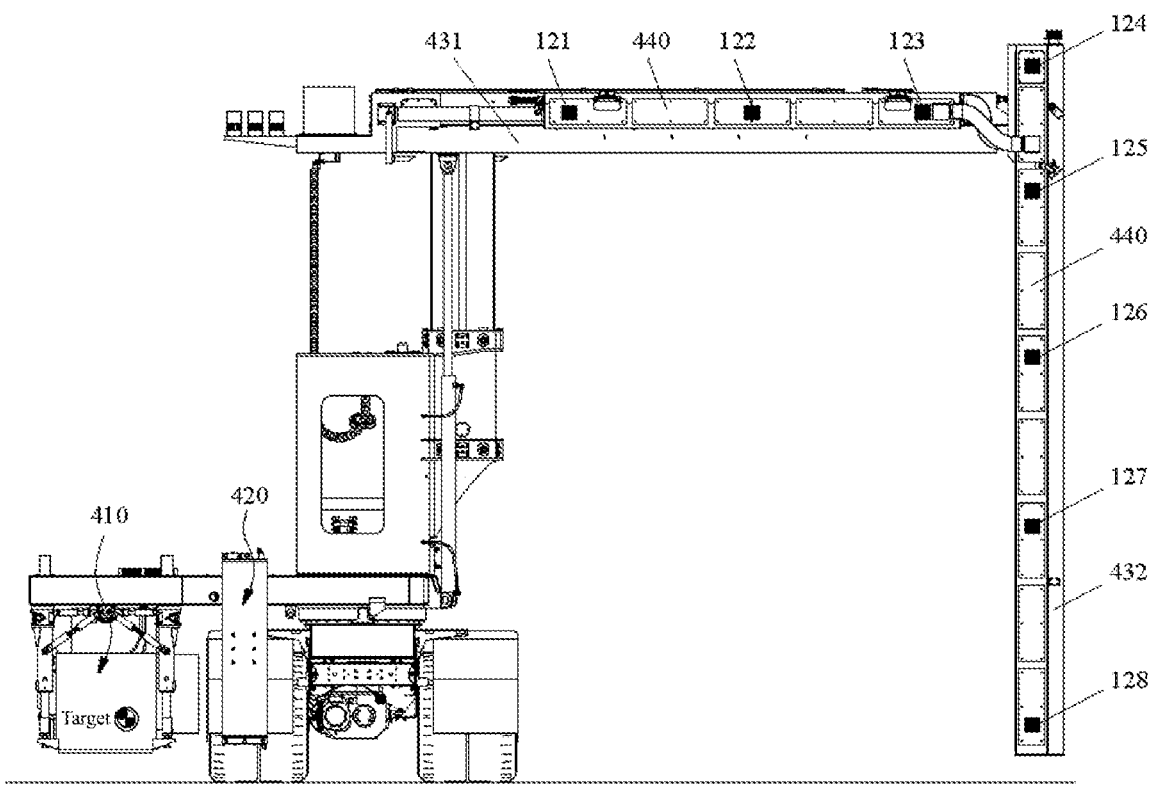
FIG. 5 is a schematic structure diagram showing a mobile scanning device according to an exemplary embodiment of the present disclosure.

As shown in FIG. 5, the mobile scanning device includes a ray source 410, a horizontal detector arm 431, a vertical detector arm 432, and a plurality of detectors 440 located on the horizontal detector arm 431 and the vertical detector arm 432.

In an embodiment, each of the detectors on the horizontal detector arm 431 and the vertical detector arm 432 can be regarded as an arm swing monitor point. Each arm swing monitor point is provided with an arm swing detector.

In another embodiment, the horizontal detector arm 431 and the vertical detector arm 432 may be divided into a plurality of monitor areas, each of which is provided with an arm swing detector.

As an example, the horizontal detector arm 431 can be divided into three monitor areas which are respectively provided with an arm swing detector 121, an arm swing detector 122, and an arm swing detector 123.

As an example, the vertical detector arm 432 can be divided into five monitor areas which are respectively provided with an arm swing detector 124, an arm swing detector 125, an arm swing detector 126, an arm swing detector 127 and an arm swing detector 128.

In the mobile scanning device, an accelerator target of the ray source 410 acts as an X-ray emission point, and is directed to the plurality of detectors 440 on the horizontal detector arm 431 and the vertical detector arm 432 via the restriction of the collimator 420. When the X-ray emission point and the boom of the two detector arms are in a plane, the detector 440 located on the boom receives the largest dose of radiation, and the quality of the scanned image of the object under inspection is the best.

When the detector boom swings during the scanning process, the arm swing detectors respectively located on the horizontal detector arm 431 and the vertical detector arm 432 can detect the displacement offset of the mobile scanning device in the traveling direction, build the arm swing model of the detector arm, determine the change relationship between the image parameter (e.g. the grayscale) of the scanned image and the displacement offset of the detector arm based on the arm swing model and the image parameter of the scanned image (e.g. the grayscale), and correct the scanned image based on the change relationship, thereby reducing the influence of the boom swing on the scanned image and improving the image performance indexes of the scanning device.

The above embodiments may be implemented entirely or partly by software, hardware, firmware or any combination thereof. When it is implemented by software, it may be entirely or partly implemented as a computer program product or a computer readable storage medium. The computer program product or the computer readable storage medium includes one or more computer instructions. When the computer program instructions are loaded and executed on a computer, they entirely and partly produce the flowchart or functions described in the embodiments of the present disclosure. The computer may be a general purpose computer, a special purpose computer, a computer network, or another programmable apparatus. The computer instructions may be stored in the computer readable storage medium or may be transmitted from a computer readable storage medium to another computer readable storage medium. For example, the computer instructions may be transmitted by wire (for example, coaxial cable, optical fiber, digital subscriber line (DSL)) or wireless (for example, infrared, radio, microwave and so on) from a website, computer, server or data center to another website, computer, server or data center. The computer readable storage medium may be any applicable medium accessible by the computer or a data storage device such as a server or a data center integrated with one or more applicable media. The applicable medium may be a magnetic medium (for example, a soft disk, a hard disk, a magnetic tape), an optical medium (for example, a DVD) or a semiconductor medium (for example, a solid state disk (SSD)) and so on.

It is to be understood that the embodiments of the present disclosure are not limited to the specific configurations and processes described above and shown in the drawings. Also, for the purpose of concision, the detailed description of known technique is omitted herein. In the above embodiments, a number of specific steps are described and illustrated as examples. However, the processes of the embodiments of the present disclosure are not limited to the specific steps described and illustrated. A person skilled in the art may make various changes, modifications and additions, or change the order of the steps after understanding the spirit of the present disclosure.

The above description is only for illustrating the specific embodiments of the present disclosure. It will be apparent to those skilled in the art that, for the sake of convenience and simplicity of description, specific operating processes of the systems, units and elements described above may be known by referring to corresponding processes in the foregoing method embodiments, and will not be repeated herein. It is to be understood that the scope of the present disclosure is not limited thereto. Within the technical scope of the present disclosure, various modifications or substitutions may be readily apparent to those skilled in the art, and all of the modifications or substitutions are to be included within the scope of the present disclosure.

What is claimed is:

1. A scanned image correction apparatus for a mobile scanning device, comprising an image collector, an arm swing detector, and an image processor, wherein:

the image collector is disposed on a detector arm of the mobile scanning device and configured to collect a scanned image of an object under inspection during a scanning process of scanning the object under inspection by the mobile scanning device, and determine an image parameter of the scanned image;

the arm swing detector is disposed at a monitor point on the detector arm of the mobile scanning device, and configured to detect a displacement offset of the detector arm in a specified direction and build an arm swing model of the detector arm, wherein the arm swing model is used to fit a functional relationship between the displacement offset of the detector arm and time in the scanning process; and the image processor is configured to determine a change relationship between the image parameter of the scanned image and the displacement offset of the detector arm based on the arm swing model and the image parameter of the scanned image, and correct the scanned image based on the change relationship.

2. The apparatus of claim 1, wherein the arm swing detector is further configured to:

acquire an acceleration value of the detector arm in the specified direction during the scanning process;

calculate a displacement offset of the detector arm at each specified moment and in the specified direction according to the acquired acceleration value; and determine a correspondence relationship curve between the displacement offset of the detector arm and the time in the scanning process according to the calculated displacement offset, and fit the correspondence relationship curve to obtain the arm swing model of the detector arm.

3. The apparatus of claim 2, wherein the arm swing detector comprises a plurality of acceleration sensors that are disposed at a plurality of monitor points of the detector arm, and the arm swing detector is further configured to:

acquire, during the scanning process, an acceleration value of each monitor point of the detector arm at a specified moment and in the specified direction by using the plurality of acceleration sensors;

calculate an displacement offset of each monitor point of the detector arm at each specified moment according to the acceleration values acquired by the plurality of acceleration sensors; and determine a correspondence relationship curve between the displacement offset of the detector arm at each monitor point and the time in the scanning process according to the calculated displacement offset, and fit the correspondence relationship curve to obtain the arm swing model of the detector arm.

4. The apparatus of claim 3, wherein:

the detector arm comprises at least one of two sub-detector arms that are arranged horizontally or vertically;

the sub-detector arms comprise at least one monitor area; and the acceleration sensors are arranged at monitor points in the at least one monitor area.

5. The apparatus of claim 1, wherein the image processor is further configured to:

determine the change relationship between the image parameter of the scanned image and the displacement offset of the detector arm by using the image parameter of the scanned image and the arm swing model;

analyze the change relationship between the image parameter and the displacement offset of the detector arm, and linearly fit a functional relationship between the displacement offset of the detector arm and a parameter compensation amount according to the change relationship; and calculate the parameter compensation amount of the scanned image according to the acquired displacement offset of each monitor point of the detector arm at each specified moment and the linearly fitted functional relationship between the displacement offset of the detector arm and the parameter compensation amount, and correct the image parameter of the scanned image by using the parameter compensation amount.

6. The apparatus of claim 1, wherein the specified direction is a traveling direction of the mobile scanning device.

7. A scanned image correction method for a mobile scanning device, comprising:

collecting a scanned image of an object under inspection and determining an image parameter of the scanned image during a scanning process of scanning the object under inspection by the mobile scanning device, via an image collector disposed on a detector arm of the mobile scanning device;

detecting a displacement offset of the detector arm of the mobile scanning device in a specified direction and building an arm swing model of the detector arm during the scanning process, via an arm swing detector disposed at a monitor point on the detector arm, wherein the arm swing model is used to fit a functional relationship between the displacement offset of the detector arm and time in the scanning process; and determining a change relationship between the image parameter of the scanned image and the displacement offset of the detector arm based on the arm swing model and the image parameter of the scanned image and correcting the scanned image based on the change relationship, via an image processor.

8. The method of claim 7, wherein the detecting a displacement offset of the detector arm in a specified direction and building an arm swing model of the detector arm during the scanning process via an arm swing detector disposed at a monitor point on the detector arm comprises:

acquiring an acceleration value of the detector arm in the specified direction during the scanning process;

calculating the displacement offset of the detector arm at each specified moment and in the specified direction according to the acquired acceleration value; and determining a correspondence relationship curve between the displacement offset of the detector arm and the time in the scanning process according to the calculated displacement offset, and fit the correspondence relationship curve to obtain the arm swing model of the detector arm.

9. The method of claim 7, wherein the detecting a displacement offset of the detector arm in a specified direction and building an arm swing model of the detector arm during the scanning process via an arm swing detector disposed at a monitor point on the detector arm comprises:

acquiring, during the scanning process, an acceleration value of each monitor point of the detector arm at a specified moment and in the specified direction, via a plurality of acceleration sensors disposed on the detector arm;

calculating a displacement offset of each monitor point of the detector arm at each specified moment according to the acceleration values acquired by the plurality of acceleration sensors; and determining a correspondence relationship curve between the displacement offset of the detector arm at each monitor point and the time in the scanning process according to the calculated displacement offset, and fitting the correspondence relationship curve to obtain the arm swing model of the detector arm.

10. The method of claim 9, wherein:

the detector arm is at least one of two sub-detector arms that are arranged horizontally or vertically;

the sub-detector arms comprise at least one monitor area; and the plurality of acceleration sensors are arranged at monitor points in the at least one monitor area.

11. The method of claim 7, wherein the determining a change relationship between the image parameter of the scanned image and the displacement offset of the detector arm based on the arm swing model and the image parameter of the scanned image and correcting the scanned image based on the change relationship comprises:

determining the change relationship between the image parameter of the scanned image and the displacement offset of the detector arm by using the image parameter of the scanned image and the arm swing model;

analyzing the change relationship between the image parameter and the displacement offset of the detector arm, and linearly fitting a functional relationship between the displacement offset of the detector arm and a parameter compensation amount according to the change relationship; and calculating the parameter compensation amount of the scanned image according to the acquired displacement offset of each monitor point of the detector arm at each specified moment and the linearly fitted functional relationship between the displacement offset of the detector arm and the parameter compensation amount, and correcting the image parameter of the scanned image by using the parameter compensation amount.

12. A mobile scanning device, comprising a ray source, a collimator, a detector arm, a detector, and the apparatus of claim 1, wherein:

the detector arm comprises a first sub-detector arm and a second sub-detector arm, the first sub-detector arm is configured to be horizontal or vertical to the second sub-detector arm, and the detector is disposed on at least one of the first sub-detector arm and the second sub-detector arm;

the ray source is configured to radiate rays to penetrate an object under inspection;

the rays radiated by the ray source are directed to the detector via the collimator; and the detector is configured to receive the rays that penetrate the object under inspection, and generate a scanned image of the object under inspection from the received rays.

13. The mobile scanning device of claim 12, further comprising:

a radiation dose monitoring module configured to monitor a radiation dose of the rays so as to calibrate the radiation dose of the ray source.

\* \* \* \* \*